United States Patent
Bunker et al.

(10) Patent No.: US 11,766,733 B2
(45) Date of Patent: *Sep. 26, 2023

(54) WELDING SYSTEM UTILIZING A DISTRIBUTED POWER BUS

(71) Applicant: Illinois Tool Works Inc., Glenview, IL (US)

(72) Inventors: Thomas A. Bunker, De Pere, WI (US); Alan A. Manthe, New Longdon, WI (US); Anthony V. Salsich, Appleton, WI (US); Michael David Madsen, Freemont, WI (US); Bruce Patrick Albrecht, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/532,316

(22) Filed: Nov. 22, 2021

(65) Prior Publication Data

US 2022/0193808 A1 Jun. 23, 2022

Related U.S. Application Data (63) Continuation of application No. 13/538,835, filed on Jun. 29, 2012, now Pat. No. 11,179,794.

(51) Int. Cl.
*B23K 9/10* (2006.01)

(52) U.S. Cl.
CPC ................. *B23K 9/1043* (2013.01)

(58) Field of Classification Search
CPC ...... B23K 9/10; B23K 9/1006; B23K 9/1043; B23K 9/1081

USPC ......... 219/130.21, 137 PS, 130.1, 133, 136, 219/121.11; 322/24, 44, 20, 28, 89; 320/103, 104; 290/1 A, 2, 4 R

See application file for complete search history.

(56) References Cited

U.S. PATENT DOCUMENTS

| | | |
|---|---|---|
| 4,247,751 A | 1/1981 | Ashton |
| 5,601,741 A | 2/1997 | Thommes |
| 5,751,150 A | 5/1998 | Rippel |
| 5,968,385 A | 10/1999 | Beeson et al. |
| 6,002,103 A | 12/1999 | Thommes |
| 6,111,217 A | 8/2000 | Beeson |
| 6,236,014 B1 | 5/2001 | Ulrich |
| 6,239,407 B1 | 5/2001 | Thommes |
| 6,310,321 B1 | 10/2001 | Beeson |

(Continued)

FOREIGN PATENT DOCUMENTS

| | | |
|---|---|---|
| EP | 0879665 | 11/1998 |
| WO | 2010144604 | 12/2010 |

OTHER PUBLICATIONS

Chongqing Yuda Technology Co, Ltd., http://cqyunda.en.alibaba.com/, (accessed Jul. 12, 2012).

(Continued)

*Primary Examiner* — Tu B Hoang
*Assistant Examiner* — Alba T Rosario-Aponte
(74) *Attorney, Agent, or Firm* — McAndrews, Held & Malloy, Ltd.

(57) ABSTRACT

In certain embodiments, a system includes a welding-type system including circuitry configured to receive direct current (DC) power directly from a distributed DC bus, to generate a current using the received DC power, and to isolate the welding-type system from the distributed DC bus.

20 Claims, 5 Drawing Sheets

(56) References Cited

U.S. PATENT DOCUMENTS

| | | | |
|---|---|---|---|
| 6,329,636 B1 * | 12/2001 | Geissler | B23K 9/1056 363/142 |
| 6,469,401 B2 | 10/2002 | Beeson | |
| 6,674,179 B2 | 1/2004 | Beeson | |
| 6,777,649 B2 | 8/2004 | Reynolds | |
| 6,815,639 B2 | 11/2004 | Geissler | |
| 6,849,827 B2 | 2/2005 | Thommes | |
| 6,894,401 B2 | 5/2005 | Beeson | |
| 6,982,398 B2 | 1/2006 | Albrecht | |
| 6,987,242 B2 | 1/2006 | Geissler | |
| 7,049,546 B2 | 5/2006 | Thommes | |
| 7,112,945 B2 | 9/2006 | Beeson | |
| 7,183,517 B2 | 2/2007 | Albrecht | |
| 7,235,759 B2 | 6/2007 | Geissler | |
| 7,312,419 B2 | 12/2007 | Beeson | |
| 7,777,447 B2 | 8/2010 | Vogel | |
| 7,795,840 B2 | 9/2010 | Vogel | |
| 7,838,797 B2 | 11/2010 | Albrecht | |
| 8,080,761 B2 | 12/2011 | Matthews | |
| 8,115,328 B2 | 2/2012 | Fosbinder | |
| 8,125,094 B2 | 2/2012 | Radtke | |
| 2004/0217097 A1 | 11/2004 | Bunker | |
| 2005/0224478 A1 | 10/2005 | Stropki | |
| 2007/0181547 A1 | 8/2007 | Vogel | |
| 2007/0187376 A1 | 8/2007 | Albrecht | |
| 2008/0314885 A1 | 12/2008 | Hutchison | |
| 2009/0057285 A1 | 3/2009 | Bashore | |
| 2009/0101637 A1 * | 4/2009 | Geissler | B23K 9/1062 219/130.51 |
| 2010/0155384 A1 | 6/2010 | Albrecht | |
| 2010/0187210 A1 | 7/2010 | Albrecht | |
| 2010/0314181 A1 * | 12/2010 | Beeson | B60K 25/02 180/65.21 |
| 2011/0006046 A1 * | 1/2011 | Albrecht | H01M 16/006 219/133 |
| 2011/0114607 A1 | 5/2011 | Albrecht | |
| 2011/0114608 A1 | 5/2011 | Albrecht | |
| 2011/0155710 A1 | 6/2011 | Farah | |
| 2011/0180522 A1 | 7/2011 | Bunker | |
| 2011/0309054 A1 * | 12/2011 | Salsich | B23K 9/091 219/108 |
| 2012/0006792 A1 | 1/2012 | Rozmarynowski | |
| 2012/0074116 A1 | 3/2012 | Matthews | |

OTHER PUBLICATIONS

EnPak, http://www.enpak.com/products/, (accessed Jul. 12, 2012).
H200 Series Engine-Drive Arc Welding Machine, http://shop200911131096548976.en.china.cn/selling-leads/img_1098905981_1.html, (accessed Jul. 12, 2012).
International Search Report from PCT application No. PCT/US2013/047215 dated Nov. 5, 2013, 11 pgs.
Miller Electric Mfg. Co.; New Trailblazer 325/275 with Synthetic Aux Owner's Manual; Jun. 2012.
Miller Electric Mfg. Co.; Pipe Pro 304 Owner's Manual; Jan. 2011; Index No. PWS/4.0.
Permanent Magnet Geneator Set, http://www.chinavalvepump.com/Siteshow/503/Product4764.html, (accessed Jul. 12, 2012).
WG6500 Gasoline Welding Generator, http://cqyunda.en.alibaba.com/product/254464944-213135952/WG6500_Gasoline_Welding_Generator.html, (accessed Jul. 12, 2012).

* cited by examiner

WELDING SYSTEM UTILIZING A DISTRIBUTED POWER BUS

The present application is a continuation of U.S. application Ser. No. 13/538,835 filed Jun. 29, 2012 (U.S. Pat. No. 11,179,794) which is incorporated herein by reference in its entirety.

BACKGROUND

The present disclosure relates generally to welding systems, including welders. Specifically, the present disclosure relates to a DC-powered welding system.

Welding systems have become virtually ubiquitous throughout industry. Such systems are currently used in all industries, including manufacturing, physical plant construction, ship building, pipeline construction, maintenance and repair, and so forth. While variations exist in the system configurations and their modes of operation, many such systems are strictly electrical and rely upon the creation of a welding arc to melt and fuse base metals and/or adder metals, typically in the form of rods and wires. Currently available systems include, for example, gas metal arc welding (GMAW) systems, gas tungsten arc welding (GTAW), shielded metal arc welding (SMAW) systems, etc. In conventional terms, such systems may include so-called stick welders, tungsten inert gas (TIG) welders, metal inert gas (MIG) welders, and so forth. It should be noted that in the present context, although references are made to "welding" systems and operations, the term here is intended to cover similar and related processes, such as heating (e.g., induction heating used to support welding operations) systems, and cutting systems (e.g., plasma torch systems).

Historically, the industrial welding market has favored an alternating current (AC) power distribution system over a direct current (DC) power distribution system due to several advantages of AC power distribution. For example, AC power distribution systems are known for ease of changing voltages using a transformer, and relatively low loss due to transmission over long distances. However, DC loads have always existed, and the percentage of applications that use DC power has been increasing. Today, many loads utilize DC power, from light rail systems to computers, to server farms. Despite the general advantages of AC power distribution systems, it has been shown that server farms generally run more efficiently when powered off of a DC bus. This is partially due to the removal of unnecessary power conversion stages, and partially due to technical advances in power distribution techniques and equipment.

With the acceptance and observed advantage of using DC power distribution in the server farm market, it may be beneficial to implement DC power distribution in the industrial welding market as well. However, existing arc welders are typically designed to be used with AC power distribution. Thus, there is a need for an arc welder for use with DC power distribution systems.

BRIEF DESCRIPTION

In one embodiment, a system includes a welding-type system including circuitry configured to receive DC power directly from a distributed DC bus, to generate a current using the received DC power, and to isolate the welding-type system from the distributed DC bus.

In another embodiment, a method includes receiving DC power at a welding-type system directly from a distributed DC bus. The method also includes conditioning the DC power to generate a current from the welding-type system. The method further includes isolating power conditioning circuitry of the welding-type system from the distributed DC bus.

In another embodiment, a system includes a power distribution bus configured to deliver weld power to a welding application, and to deliver auxiliary power to an auxiliary device associated with the welding application. The system also includes a generator coupled to the power distribution bus, wherein the generator is configured to deliver power to the power distribution bus.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present disclosure provide a system having a DC input welder capable of receiving and using DC power directly from a DC power distribution system. As DC power distribution becomes more and more prevalent in industry, the DC input welder may be advantageous over typical AC input welders as the DC input welder may be configured to receive and use DC power directly, reducing the need for conventional power conversion circuitry. The DC input welder is configured to receive power from a DC bus or other outlet of a DC power distribution system. As will be described in further detail, the DC input welder includes a DC plug capable of handling the special needs of DC power connections, as well as internal circuitry capable of handling and processing the received DC power. The DC input welder of the present disclosure may be used with various types of welding systems and equipment. For example, the DC input welder may be configured to be compatible with a stick welding system, a tungsten inert gas (TIG) welding system, a metal inert gas (MIG) welding system, a manual metal arc (MMA) welding system, and so forth. The DC input welder may output appropriate power to power a variety of tools and components associated with such welding systems, including welding torches, spool guns, wire feeders, and so forth. It should be noted that the DC input welder described herein is a specific embodiment of the welding-type system provided in the present disclosure. The welding-type system may also include, for example, heating (e.g., induction heating used to support welding operations) systems, and cutting systems (e.g., plasma torch systems).

Figure 1:
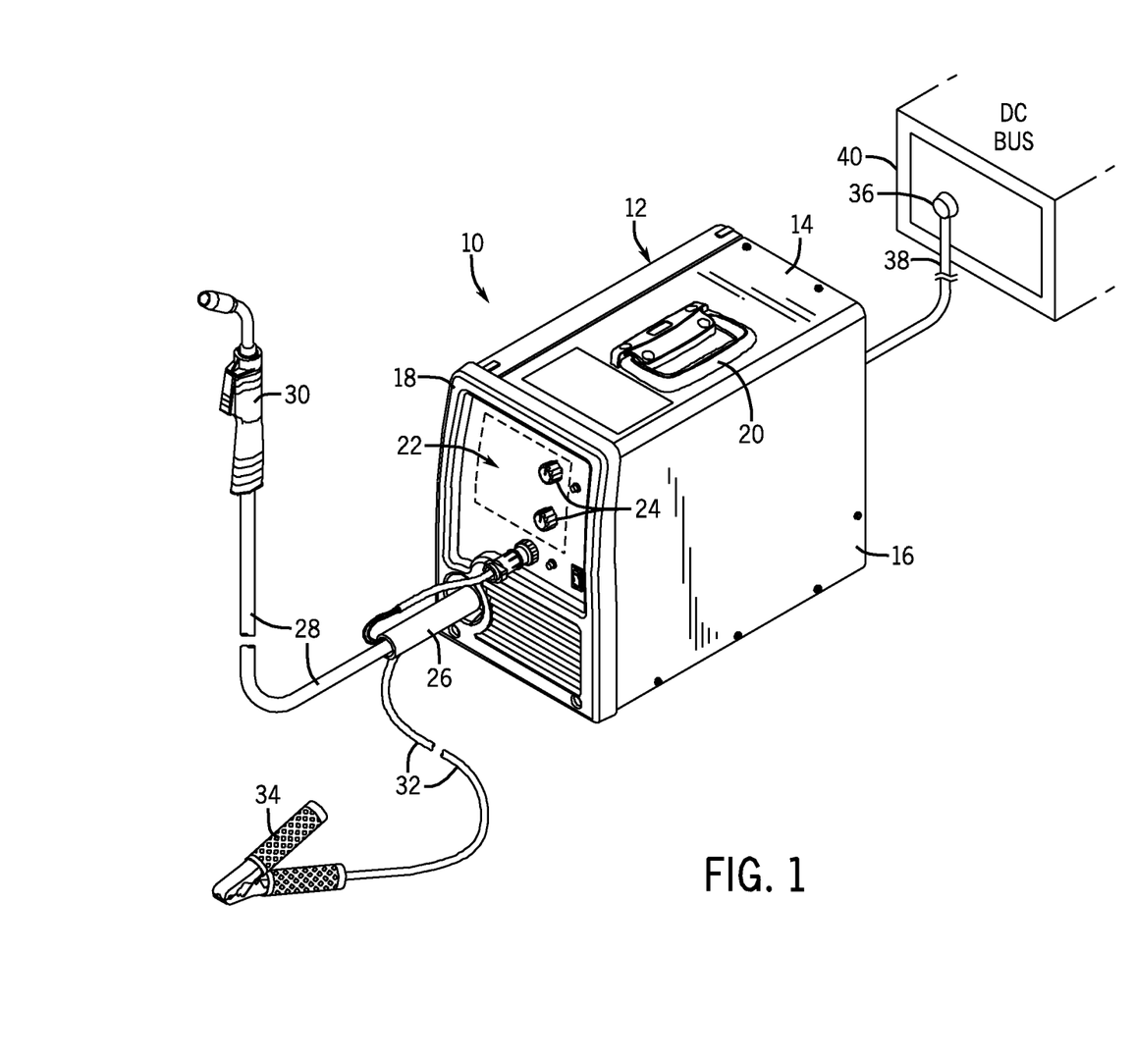
FIG. 1 is a perspective view of a DC input welding system, in accordance with aspects of the present disclosure.

Turning now to the drawings, FIG. 1 is a perspective view of an exemplary welding system 10, in accordance with the present disclosure. The welding system 10 includes a DC input welder 12. In certain embodiments, the DC input welder 12 may further include a top panel 14, a side panel 16, and a front panel 18. In certain embodiments, the top panel 14 may include a handle 20 that facilitates transport of the DC input welder 12 from one location to another by an operator, if desired. The front panel 18 includes a control panel 22 adapted to allow an operator to set one or more parameters of the welding process, for example, via knobs 24 (or buttons, touchscreens, etc.).

In certain embodiments, the DC input welder 12 includes the functionality of a wire feeder. Such embodiments may include a wire drive configured to receive control signals to drive rotation of a wire spool. The wire drive feeds wire for the welding operation. In another embodiment, a separate wire feeder may be attached to the DC input welder 12. Such a separate wire feeder may also include a wire drive and a wire spool.

A main electrical connector 26 couples to the DC input welder 12 via the front panel 18. A cable 28 may extend from the main electrical connector 26 to a welding torch 30 configured to be utilized in a welding operation to establish a welding arc. A second cable 32 may be attached to the DC input welder 12 through an aperture in the front panel 18, and terminates in a clamp 34 that is adapted to clamp to a work piece (not shown) during a welding operation to close an electrical circuit between the DC input welder 12, the welding torch 30, and the work piece.

The DC input welder 12 may also be coupled to a DC input power cable 38 having a DC input plug 36. Power is generally provided to the DC input welder 12 via the DC input plug 36 and DC input power cable 38. During a welding operation, the DC input welder 12 is configured to receive primary power from a primary DC power source, such as a DC power bus 40, which may be coupled to a DC power distribution system, to condition such incoming DC power, and to output a weld power output appropriate for use in the welding operation. As described in detail below, embodiments of the DC input welder 12 disclosed herein are adapted to allow the DC input welder 12 to directly receive and use DC power from a DC power distribution system that may, for example, supply relatively high voltage DC power (e.g., within a range between approximately 300 volts DC and approximately 550 volts DC). For example, as described in greater detail below, the DC power distribution system from which the DC input welder 12 receives the DC power may include a plurality of distributed DC power sources.

Figure 2:
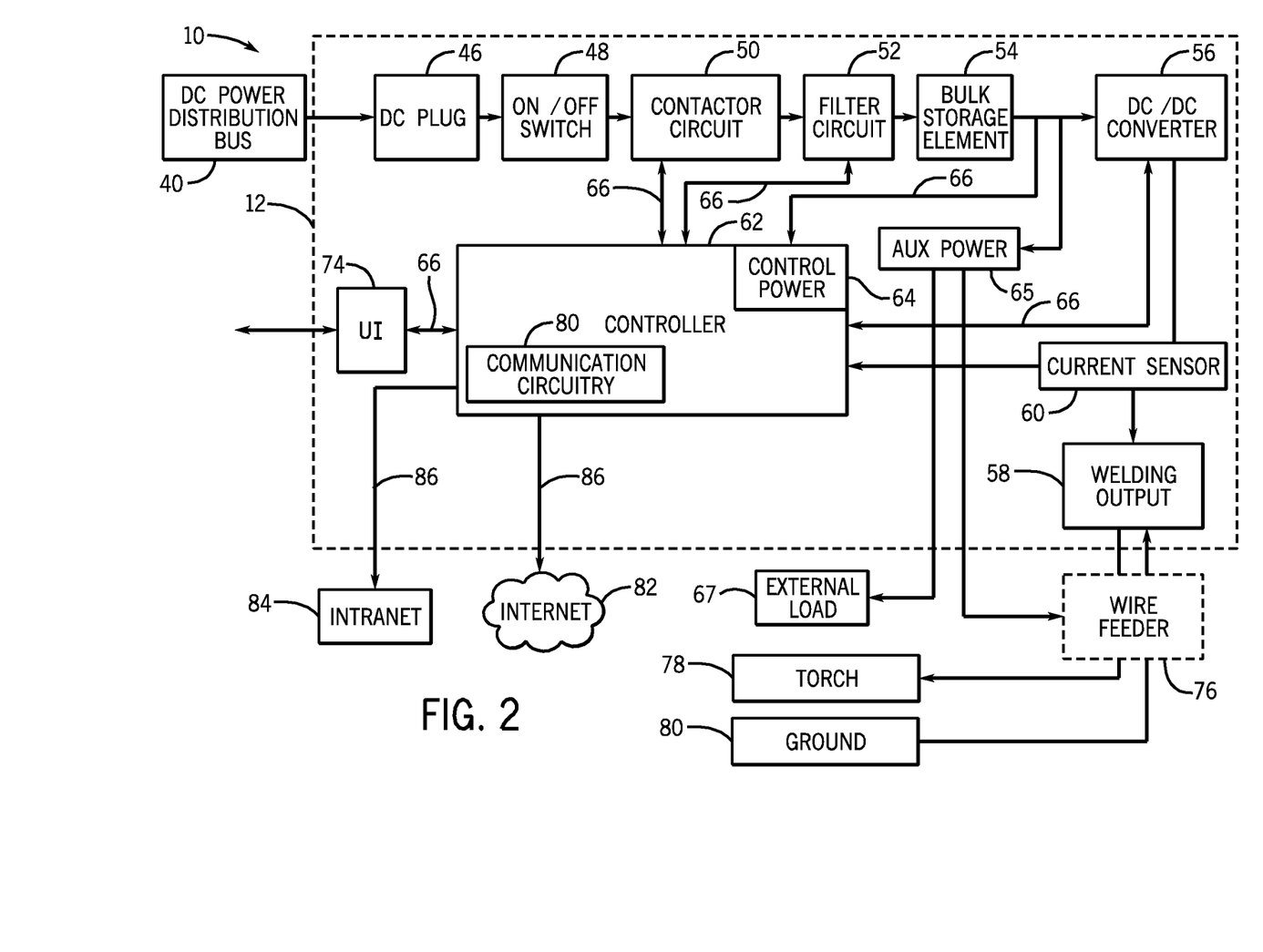
FIG. 2 is a block diagram of a DC input welding system, in accordance with aspects of the present disclosure.
Figure 3:
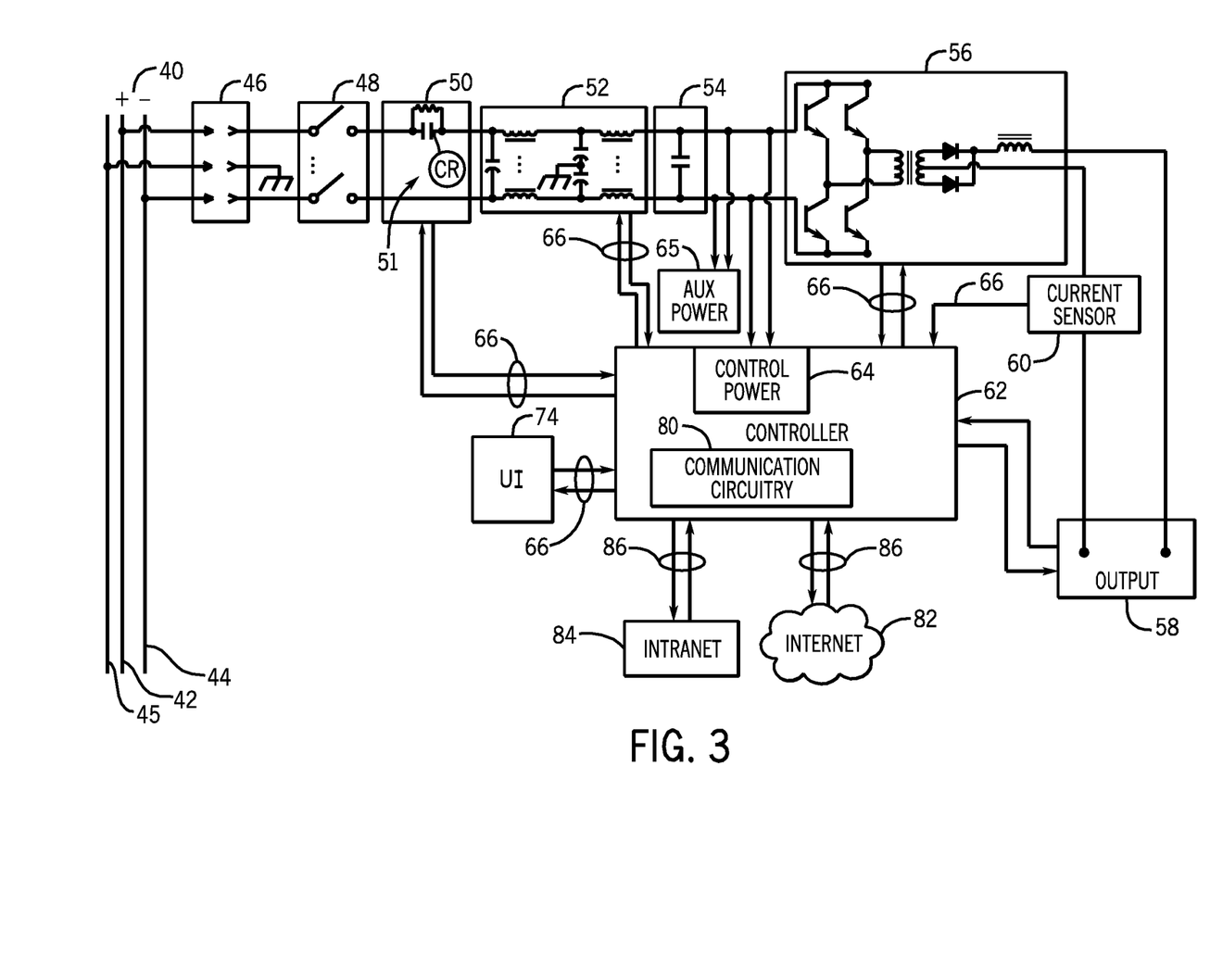
FIG. 3 is a representation of a circuit diagram of a DC input welding system, in accordance with aspects of the present disclosure.

FIG. 2 is a block diagram of the welding system 10 of FIG. 1, including certain functional elements of the DC input welder 12. FIG. 3 is a circuit diagram illustrating an example of a specific embodiment of the DC input welder 12. It should be noted that the DC input welder 12 may include circuit elements different from, in addition to, and/or configured differently than those shown in FIG. 3. In other words, the specific circuit elements illustrated in FIG. 3 are merely exemplary and not intended to be limiting. FIGS. 2 and 3 will be generally referred to concurrently to disclose both the theory, as well as a specific implementation of the welding system 10 and DC input welder 12. It will be appreciated that the functional block diagram and associated circuitry of the welding system 10 illustrated in FIGS. 2 and 3 may be implemented in the welding system 10 and DC input welder 12 illustrated in FIG. 1.

Referring now to FIG. 2, the DC input welder 12 is coupled to a DC power distribution bus 40, allowing the DC input welder 12 to receive DC power directly and to synthetically create weld power, as described in greater detail below. As such, the DC input welder 12 includes a DC power plug 46, which is configured to handle DC power, including making and breaking a DC connection. As illustrated in FIG. 3, the DC power distribution bus 40 may include a positive terminal 42, a negative terminal 44, and a ground or common terminal 45. Accordingly, the DC power plug 46 of FIG. 3 may include three corresponding contacts. In addition, in certain embodiments, the DC power plug 46 may also be configured to provide polarity protection for the DC input welder 12. In other words, the DC power plug 46 may include polarity protection circuitry to determine whether the terminals 42, 44, 45 have been connected to the DC input welder 12 correctly, and to take corrective action (e.g., alert a user via the control panel 22, isolate the other circuitry of the DC input welder 12 from the DC power distribution bus 40, or a combination thereof).

Referring again to FIG. 2, the DC input welder 12 may also include an on/off switch 48 electrically coupled to the DC power plug 46. The on/off switch 48 may open and close the welder circuit with respect to the DC power distribution bus 40 and the DC input welder 12, as illustrated by the on/off switch 48 of FIG. 3. The on/off switch 48 allows DC power to flow from the DC power distribution bus 40 to the DC input welder 12 when it is in an on (closed) state, and disconnects the DC input welder 12 from the DC power distribution bus 40 when it is in an off (open) state, such that DC power does not flow through the DC input welder 12.

In certain embodiments, the DC input welder 12 further includes a contactor circuit 50, a filter circuit 52, a bulk storage element 54, and a DC/DC converter 56. The contactor circuit 50 may include a pre-charge relay 51, as shown in FIG. 3. Generally, the pre-charge relay 51 may be configured to current-limit the incoming DC power during power up. This function may provide a controlled rise time, which protects the circuit from high in-rush currents that may occur during power up. In certain embodiments, the contactor circuit 50 may include a solid state relay. As such, the pre-charge relay 51 of the contactor circuit 50 (as well as the DC power plug 46 and on/off switch 48) isolates the majority of the circuitry of the DC input welder 12 from the DC power distribution bus 40, thereby providing protection for the DC input welder 12. For example, in certain embodiments, the contactor circuit 50 may isolate the downstream circuitry of the DC input welder 12 from the higher voltage and/or current. In certain embodiments, the voltage and/or current threshold limits may be determined by the circuitry that is included in the contactor circuit 50. However, in other embodiments, a controller 62 may be used to actively adjust the voltage and/or current thresholds (which may be set by a user via a user interface 74) and control operation of the contactor circuit 50 accordingly to isolate the DC input welder 12 from the received DC power.

The filter circuit 52 may include an electromagnetic interference (EMI) filter or other suitable filter. The filter circuit 52 may include a boost converter configured to raise or step-up the incoming voltage, or a buck converter configured to lower or step-down the incoming voltage. In certain embodiments, the filter circuit 52 may include a buck-boost converter, which may be configured to raise or lower the input voltage. The bulk storage element 54 may include an electrolytic capacitor, as shown in FIG. 3. However, in other embodiments, the bulk storage element 54 may be a battery. In certain embodiments, the DC input welder 12 may include a battery charging circuit having a charge controller which may be configured to provide voltage and current feedback. Further, the filter circuit 52 may also be configured to charge the battery, as well as to monitor voltage and charge going in and out of the battery. The output of the bulk storage element 54 may be considered conditioned DC power. Certain elements of the circuitry described herein related to receipt and conditioning of power to provide welding output and power storage may be further described in U.S. Patent Application Ser. No. 61/657,467, entitled "CONTROLLED WAVEFORM WELDING WIRE FEEDER SYSTEM AND METHOD", filed on Jun. 8, 2012, which is hereby incorporated by reference in its entirety.

The conditioned DC power may then be provided to the DC/DC converter 56. The DC/DC converter 56 may include a conventional full-bridge converter configuration, or a dual interleaved, phase shift double forward converter configuration. An example implementation of the DC/DC converter 56 is illustrated in FIG. 3, in which the DC/DC converter 56 may include a high frequency transformer, an output rectifier, and an output inductor. The DC/DC converter 56 may be configured to isolate and/or adjust an output voltage which may be outputted from the DC input welder 12 as welding power. The DC/DC converter 56 may be controlled to provide a desired welding power level to a welder output 58. The welder output 58 may include an external interface or connector (e.g., terminals) through which welding power may be provided to peripheral welding equipment, such as a wire feeder 76 and/or welding torch 78. In certain embodiments, the welding output 58 may be coupled to, and configured to provide power to, the wire feeder 76. In such cases, the wire feeder 76 may provide power to the welding torch 78 and complete the electrical circuit via a grounding device 80. Specifically, the electrical circuit may be completed through the welding torch 78, a work piece, (not shown), and the grounding device 80, which may also be coupled to the work piece.

In certain embodiments, the DC input welder 12 may further include a current sensor 60, as illustrated in FIGS. 2 and 3. The current sensor 60 may be coupled to the output of the DC/DC converter 56 such that the current sensor 60 may detect the amount of current outputted by the DC/DC converter 56. Specifically, the current sensor 60 may be coupled between the DC/DC converter 56 and the welding output 58, and configured to sense the current that is actually being outputted by the DC input welder 12, which may also be the current provided to the welding output 58. The current sensor 60 may also be coupled to the controller 62, and be configured to send a signal indicative of the current from the DC/DC converter 56 to the controller 62. As the controller 62 may be configured to control the amount of current or power to be outputted from the DC/DC converter 56, the current sensor 60 may be a part of a feedback circuit from the output of the DC/DC converter 56 back to the controller 62. As such, the controller 62 may control the DC/DC converter 56 accordingly. Essentially, the controller 62 may control, among other things, the welding output 58 parameters. In certain embodiments, the controller 62 may be powered by a control power supply 64, which generally draws its power from the DC power bus 40 via the bulk storage element 54.

In addition, in certain embodiments, the bulk storage element 54 may provide auxiliary power from an auxiliary power output 65, which may be used to power the wire feeder 76 or other external loads 67 and auxiliary devices connected to the DC input welder 12, such as grinders, powering tools, auxiliary lighting, and so forth. In certain embodiments, the auxiliary power output 65 may include at least one inverter, which is powered by the DC bus 40, and the auxiliary power output 65 provides an output of at least approximately 2.0 kilowatts. For example, in certain embodiments, the auxiliary power provided by the auxiliary power output 65 may be in a power range of approximately 2.0 kilowatts and approximately 12.5 kilowatts. Additionally, the auxiliary power provided by the auxiliary power output 65 may be provided at multiple voltage levels, such as 115V, 208V, 230V, 240V, and so forth, such that a variety of different external loads 67 and auxiliary devices may be powered by the auxiliary power. Further, in certain embodiments, the auxiliary power provided by the auxiliary power output 65 may be used to provide single-phase power and/or three-phase power. In certain embodiments, the auxiliary power provided by the auxiliary power output 65 may be converted to AC power such that AC loads may be used as well.

Additionally, the controller 62 may also be coupled to certain other circuit components, such as the contactor circuit 50, the filter circuit 52, the bulk storage element 54, and the DC/DC converter 56 via respective communication and power channels 66. Thus, the controller 62 may be configured to send control commands to such circuit components, as well as receive data, feedback, and/or power from the circuit components. Specifically, the controller 62 may be configured to monitor the DC power level with respect to the filter circuit 50 and the bulk storage element 54. As such, for example, when the voltages are at the proper level, the controller 62 may be configured to energize the contactor circuit 50. The controller 62 may also control the DC/DC converter 56. Thus, the controller 62 may be used to control parameters of the welding output 58 such as current, voltage, wire speed, and so forth. For example, in certain embodiments, the controller 62 may control a shape of a weld output waveform of the welding current generated at the welding output 58. In certain embodiments, the controller 62 may also be coupled to the wire feeder 76 such that the controller 62 controls certain wire feeder parameters, such as wire feed speed.

Accordingly, the controller 62 may further be coupled to a user interface 74. The user interface 74 may include one or more user inputs, which may allow an operator to set one or more parameters of the DC input welder 12 and/or the welding process, or control other aspects of the welding system 10. The user interface 74 may include one or more input mechanisms such as keyboards, buttons, knobs, and so forth. In certain embodiments, the user interface 74 may also include one or more displays, which may display welder information back to the operator, such as current, voltage, wire speed, process, and so forth. For example, the operator may set a desired current level to be outputted by the welding output 58 by turning a knob, and viewing the set current level on the display. Additionally, during welding, the operator may monitor the parameters (e.g., current) of the DC input welder 12 by viewing the display, and adjusting such parameters accordingly. In certain embodiments, the user interface 74 may include a touchscreen, in which the display and input mechanisms may be combined. The user interface 74 may be disposed on the front panel 18 (FIG. 1) as a part of the control panel 22 (FIG. 1).

The controller 62 may also include communication circuitry 80, which may allow the controller 62 to communicate with an intranet 84, such as a factory network, as well as with the internet 82. As such, the controller 62 may be able to download certain software updates or programs, as well as upload or send certain data to a factory, control center, or another welder. The DC input welder 12 may access such networks via communication channels 86 such as an Ethernet cable, a wireless channel, and so forth. Furthermore, the controller 62 may also communicate with a smart grid. The controller 62 and the smart grid may send and/or receive data regarding power supplies, distribution, availability, usage, and so forth. Details regarding the smart grid are described in U.S. Patent Application Publication No. 2011/0180522, entitled "Smart Grid Welding System", filed on Jan. 21, 2011, which is hereby incorporated by reference in its entirety.

Figure 4:
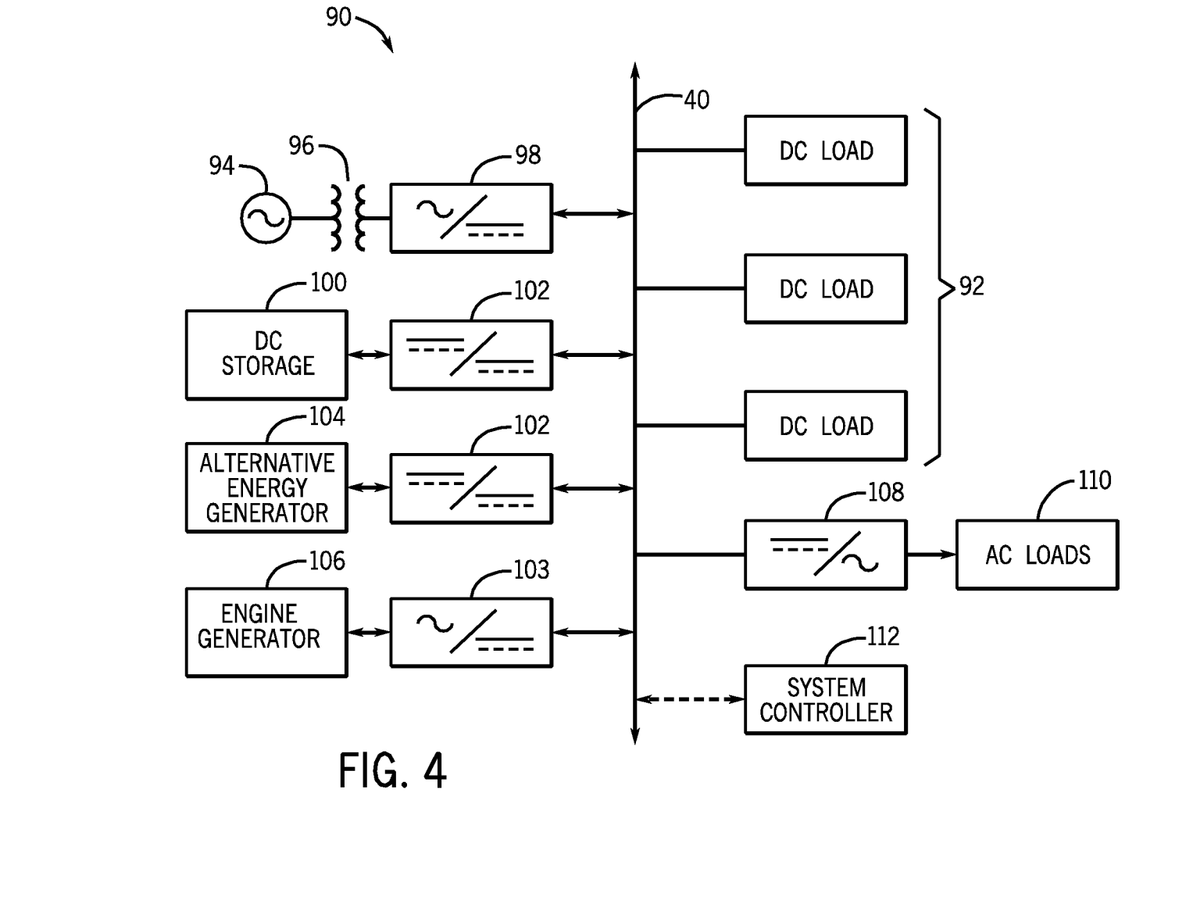
FIG. 4 is a schematic diagram of a DC power bus, in accordance with aspects of the present disclosure.

FIG. 4 illustrates an embodiment of a DC power distribution system 90 that may supply primary DC power to one or more DC loads 92 (e.g., which include the DC input welder 12 described above, as well as other similar welding-type systems that include internal circuitry similar to the DC input welder 12) of the welding system 10. In the present embodiment, the DC power bus 40 may receive power from a plurality of AC and DC power sources. In certain embodiments, the DC power bus 40 may receive power from a public utility 94, such as an electrical grid. The public utility 94 generally provides an AC voltage, which may be rectified by a bi-directional rectifier or AC/DC converter 98. In certain embodiments, the AC voltage from the public utility 94 may be transformed to a lower AC voltage by a transformer 96 or inverter, and then rectified. The output, which is generally a usable DC voltage, may be provided to the DC power bus 40 as a power source. In certain embodiments, the DC power bus 40 may be rated as 300 V, 350 V, 380 V, 550 V, or any other suitable value which may support the DC loads 92. As such, in certain embodiments, the DC power supplied by the DC power bus 40 to the DC input welder 12 may be within a range between approximately 300 volts DC and approximately 550 volts DC, within a range between approximately 380 volts DC and approximately 550 volts DC, or any other suitable range therein.

In certain embodiments, the DC power bus 40 may also receive power from a DC storage element 100. In certain embodiments, the DC voltage from the DC storage element 100 may be fed to a bi-directional DC/DC converter 102, where the DC voltage is stepped to a suitable voltage level. The bi-directional nature of the DC/DC converter 102 enables DC voltage to be supplied from the DC storage element 100 to the DC power bus 40 under certain circumstances (e.g., when the DC power bus 40 requires DC power), while transferring DC voltage back from the DC power bus 40 to the DC storage element 100 under other circumstances (e.g., when the DC power bus 40 has excess DC power). In other words, the bi-directional transfer of power to and from the DC power bus 40 may be dependent upon power demands of the DC power bus 40, as well as the DC loads 92 connected to the DC power bus 40. The DC voltage may then be supplied to the DC power bus 40 where it may be used by the DC loads 92.

Further, in certain embodiments, the DC power bus 40 may also receive power from an alternative energy generator 104, such as a wind or solar generator, fuel cell, flywheel, and so forth. The power obtained from the alternative energy generator 104 may be buffered by a bi-directional DC/DC converter 102 before it is supplied to the DC power bus 40, where it may be used by the DC loads 92. The bi-directional nature of the DC/DC converter 102 enables DC voltage to be supplied from the alternative energy generator 104 to the DC power bus 40 under certain circumstances (e.g., when the DC power bus 40 requires DC power), while transferring DC voltage back from the DC power bus 40 to the alternative energy generator 104 under other circumstances (e.g., when the DC power bus 40 has excess DC power). In other words, the bi-directional transfer of power to and from the DC power bus 40 may be dependent upon power demands of the DC power bus 40, as well as the DC loads 92 connected to the DC power bus 40. Again, the DC voltage may then be supplied to the DC power bus 40 where it may be used by the DC loads 92.

Additionally, in certain embodiments, the DC power bus 40 may receive power from an engine generator 106. Although described herein as being an engine generator 106, in certain embodiments, the generator 106 may instead be a generator driven by a motor instead of an engine. As illustrated, in certain embodiments, the power obtained from the engine generator 106 may likewise be rectified by an AC/DC converter 103 and then supplied to the DC power bus 40. However, in certain situations (e.g., during startup of the engine generator 106), a bi-directional DC/DC converter 102 may be used to provide power from the DC power bus 40 to the engine generator 106. In such situations, in addition to the bi-directional DC/DC converter 102, the DC input welder 12 may also include a bi-directional channel which may allow the DC input welder 12 to receive power from the DC power bus 40 as well as send power to the DC power bus 40.

The DC loads 92 may include the welding system 10 (e.g., which may include the DC input welder 12 described above, as well as other similar welding-type systems that include internal circuitry similar to the DC input welder 12), as well as other welding peripherals and related equipment. Additionally, in certain embodiments, the DC power bus 40 may also be configured to supply power to a DC/AC inverter 108. The DC/AC inverter 108 may generally convert the DC power to AC power that can be used by an AC load 110, such as an AC welder.

In certain embodiments, the DC power bus 40 and some of the power sources may be a part of a microgrid. For example, the microgrid may include one or more independent power sources, such as the DC storage element 100, the alternative energy generator 104, and/or the engine generator 106. Such power sources may be configured to collectively generate and distribute power to certain loads, such as an industrial plant or facility. The microgrid may also be coupled to a centralized grid, which may be provided by the public utility 94. Further, the power sources (94, 100, 104, 106) may be configured to send and receive power to and from each other via the bi-directional DC/DC converters 102 and the DC power bus 40. For example, as described above, the alternative energy generator 104 may receive power from the DC power bus 40 as well as provide power to the DC power bus 40. As such, the power sources (94, 100, 104, 106) may be coordinated in order to achieve an optimal power distribution configuration between the power sources (94, 100, 104, 106) and the DC loads 92.

More specifically, in certain embodiments, the DC power distribution system 90 may include a system controller 112 that controls the distribution of DC power to and from the DC power bus 40. In certain embodiments, the system controller 112 may actually be integral to one of the DC loads 92. For example, in certain embodiments, the system controller 112 may, in fact, be the controller 62 of the DC input welder 12, which is one of the DC loads 92. It will be appreciated that, in certain embodiments, the system controller 112 (as well as the controller 62 of the DC input welder 12) may include a non-transitory computer-readable medium that includes computer instructions, and a processor for executing the computer instructions encoded on the computer-readable medium, for controlling the distribution of DC power to and from the DC power bus 40 (and, in the case of the controller 62 of the DC input welder 12, for controlling operation of the DC input welder 12 as described above with respect to FIGS. 2 and 3).

The welding system 10 described above includes a DC input welder 12 that may be manufactured at a lower cost than conventional welders as it eliminates the use of many circuit components, specifically circuit components commonly associated with AC/DC or DC/AC conversion. Furthermore, there may also be an overall efficiency gain in the welding system 10 as less heat may be produced in the DC input welder 12, thereby reducing the need for heat dissipation components.

Figure 5:
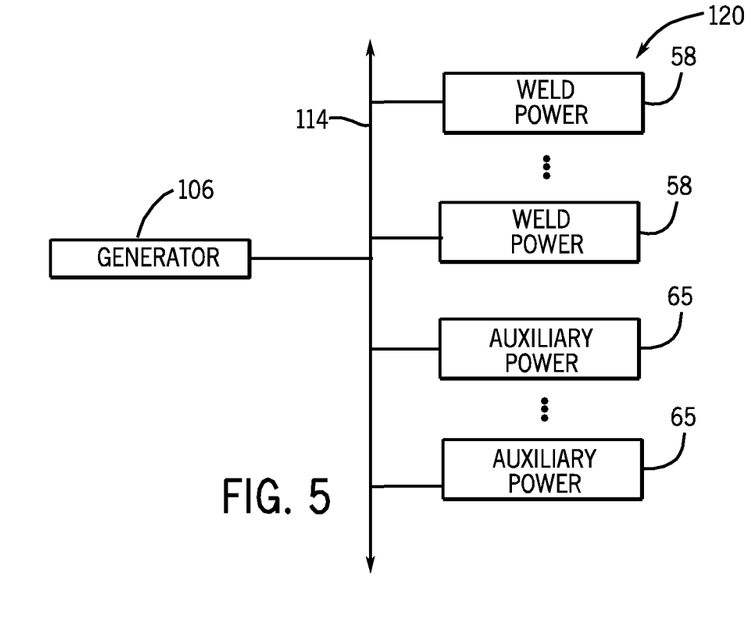
FIG. 5 is a schematic diagram of an AC power distribution system, in accordance with aspects of the present disclosure.

While a DC bus 40 is primarily discussed above, certain embodiments may include an AC bus. For example, FIG. 5 illustrates an AC power distribution system 120, in which the engine generator 106 is coupled to a distributed AC bus 114 to supply power to the distributed AC bus 114. As described above, although presented as being an engine generator 106, in certain embodiments, the generator 106 may instead be a generator driven by a motor instead of an engine. The distributed AC bus 114 may provide the weld power to one or more weld outputs 58 and/or auxiliary power to one or more auxiliary power outputs 65 of various distributed welding-types systems, such as welders. As previously mentioned, the weld outputs 58 may provide welding arc power outputted from welders for welding applications, and the auxiliary power outputs 65 may power loads associated with the welding applications, such as grinders, tools, and so forth. In certain embodiments, the auxiliary power provided by the auxiliary power outputs 65 may be in a power range of approximately 2.0 kilowatts and approximately 12.5 kilowatts. The auxiliary power may also provide power at multiple voltage levels (e.g., 115V, 180V, 230V, and 240V), at any suitable frequencies, as well as multiple phases (e.g., single-phase power, three-phase power, and so forth) to suit a variety of devices that may be powered by the auxiliary power outputs 65.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
   a distributed direct current (DC) bus coupled to a plurality of power sources that provide power to the distributed DC bus; and
   a welding-type system comprising:
      a welding output configured to provide welding power;
      circuitry configured to condition DC power received from the distributed DC bus into welding power, the circuitry comprising:
         a contactor circuit configured to isolate the welding-type system from the distributed DC bus comprising a pre-charge relay configured to limit an incoming DC current into the welding type system during a power up condition to a threshold current limit; and
         a controller electrically coupled to the contactor circuit via feedback and control lines, wherein the controller is configured to control operation of the contactor circuit using feedback and control signals via the feedback and control lines.

2. The system of claim 1, comprising an engine generator configured to generate power supplied to the distributed DC bus.

3. The system of claim 1, further comprising a DC input plug configured to directly couple the welding-type system to the distributed DC bus.

4. The system of claim 3, wherein the DC input plug comprises polarity protection circuitry.

5. The system of claim 1, wherein one of the plurality of power sources is an electric grid that provides AC voltage, and wherein the AC voltage is provided to the distributed DC bus via one of a rectifier or an AC/DC converter.

6. The system of claim 1, wherein the controller controls adjustment of the threshold current limit in response to a control signal.

7. The system of claim 1, wherein the controller is configured to control a weld output waveform of the generated current.

8. The system of claim 1, wherein the DC power is within a range between approximately 380 volts DC and approximately 550 volts DC.

9. The system of claim 1, wherein the distributed DC bus is capable of providing power to at least one of the plurality of power sources.

10. The system of claim 1, wherein the welding-type system comprises an auxiliary power output configured to output at least approximately 2.0 kilowatts of auxiliary power.

11. The system of claim 10, wherein the auxiliary power output is configured to provide the auxiliary power at one or more of a plurality of voltages.

12. A system, comprising:
    a distributed direct current (DC) power bus coupled to a plurality of power sources that provide power to the distributed DC power bus, the distributed DC power bus comprising a positive terminal, a negative terminal, and a ground terminal, and
    wherein the plurality of power sources comprising at least a generator coupled to the distributed DC power bus, the generator configured to deliver power to the distributed DC power bus; and
    circuitry configured to condition DC power received from the distributed DC power bus into welding power and auxiliary power comprising:
       a contactor circuit comprising a pre-charge relay configured to limit a DC current during a power up condition; and
       a bulk storage element configured to provide conditioned DC power directly to an auxiliary output.

13. The system of claim 12, wherein the generator is configured to receive power from the distributed DC power bus.

14. The system of claim 12, wherein the plurality of power sources comprises an alternative energy generator.

15. The system of claim 12, further comprising an electromagnetic interference filter configured to monitor and charge the bulk storage element.

16. The system of claim 12, wherein the generator is configured to generate the power supplied to the distributed DC power bus.

17. A system, comprising:
    a distributed direct current (DC) power bus electrically coupled to a plurality of DC power sources that provide power to the distributed DC power bus;
    a welding-type system comprising:
       a welding output configured to provide welding power to perform a welding operation; and
       circuitry of the welding-type system, comprising:
          a contactor circuit configured to at least partially isolate the circuitry of the welding-type system from the distributed DC power bus, the contactor circuit comprising a pre-charge relay configured to limit an incoming DC current into the welding-type system during a power up condition to a threshold current limit; and a bulk storage element electrically coupled between the contactor circuit and the welding output; and a controller electrically coupled to the contactor circuit via feedback and control lines, wherein the controller is configured to control operation of the contactor circuit using feedback and control signals via the feedback and control lines.

18. The system of claim 17, comprising a DC plug having one or more contacts configured to make and break a DC connection between the distributed DC power bus and the welding-type system.

19. The system of claim 18, comprising an on/off switch electrically coupled between the DC plug and a pre-charge relay, wherein the on/off switch electrically allows DC power to flow to the circuitry when the on/off switch is in a closed state and disconnects the circuitry of the welding-type system from the distributed DC power bus when it is in an open state.

20. The system of claim 18, wherein the one or more contacts comprise a positive contact, a negative contact, and a ground contact, and wherein the positive contact, the negative contact, and the ground contact correspond to a positive terminal, a negative terminal, and a ground terminal of the distributed DC power bus, respectively.

* * * * *